Bruce

[11] 3,744,909
[45] July 10, 1973

[54] GRAVITY INTERFEROMETER SYSTEM
[76] Inventor: Marshall H. Bruce, P.O. Box 331, Bedford, Mass. 01730
[22] Filed: Mar. 26, 1970
[21] Appl. No.: 22,872

[52] U.S. Cl. .............................................. 356/106
[51] Int. Cl. ............................................ G01b 9/02
[58] Field of Search ........................... 356/106–113

[56] References Cited
UNITED STATES PATENTS
2,701,961   2/1955   Svensson............................ 356/106

*Primary Examiner*—Ronald L. Wibert
*Assistant Examiner*—Conrad Clark

[57] ABSTRACT

A new type of gravity interferometer using an equilibrium fluid medium for its characteristic optical flatness is described. The technique consists of using the fluid surface to act as the sensing element for monitoring the direction of force gradients, since a sufficiently static and isolated fluid element does not exhibit any shear. One common example of this is the flat surface which a basin like container or fluid assumes when it is placed upon the earth. Such a surface is perpendicular to the vertical, that is, at right angles to the gradient of the earth's gravitational potential field. The new system includes a modification of the well known Michelson Interferometer. When complete and in operation the instrument indicates, over time, the very minute tilt angles of the earth's land mass in terms of a visible and measurable fringe pattern shift. These small land mass tilt angles, in turn, substantiate the predication of the tidal effects on the earth's land mass that are caused, primarily, by both solar and lunar gravitational attraction. The new instrument possesses a high degree of resolution. Matters related to mechanical and thermal considerations are discussed. Also, information is presented for an optional method of electronically monitoring and recording the instruments data, as signal output. Local noise is well dampened by the use of the fluid medium. The geophysical theory involved is developed and summarized. The latter agrees with the empirical, or with the results obtained from continuous operation of the new gravity interferometer system.

2 Claims, 7 Drawing Figures

Patented July 10, 1973

3,744,909

5 Sheets-Sheet 1

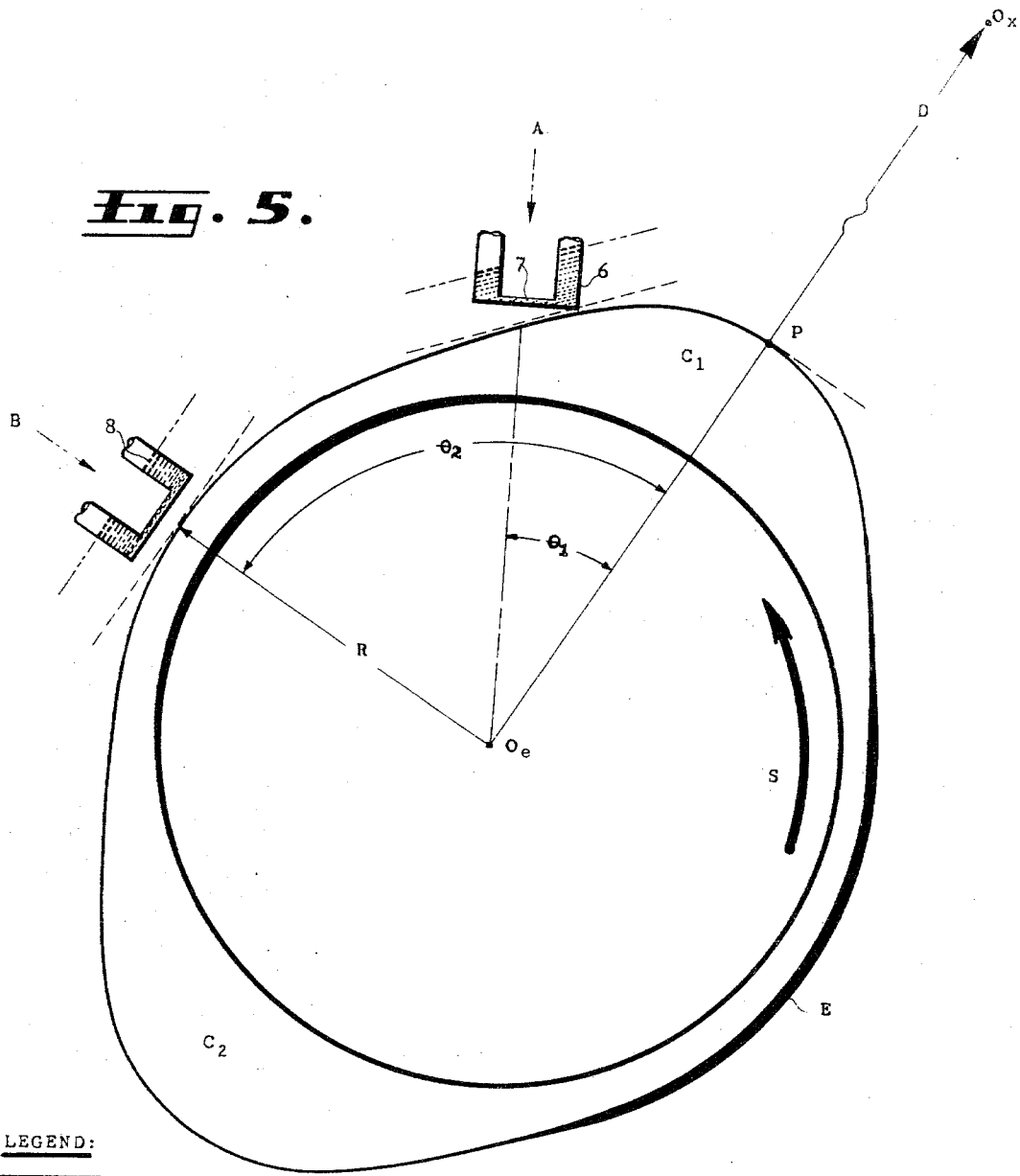

GRAVITY INTERFEROMETER SYSTEM

My invention relates to improvements in gravity metering devices and more particularly to a gravity-interferometer system having an extreme degree of high resolution.

The objects of my invention are to produce a most effective and a most sensitive gravity-inteferometer system having as an integral part of its optical system, a pair of interconnectd and intercommunicative fluid equilibrium reference optical flats of an order of excellence which, heretofore, has not been attained or used in the state of the art.

Figure 1:
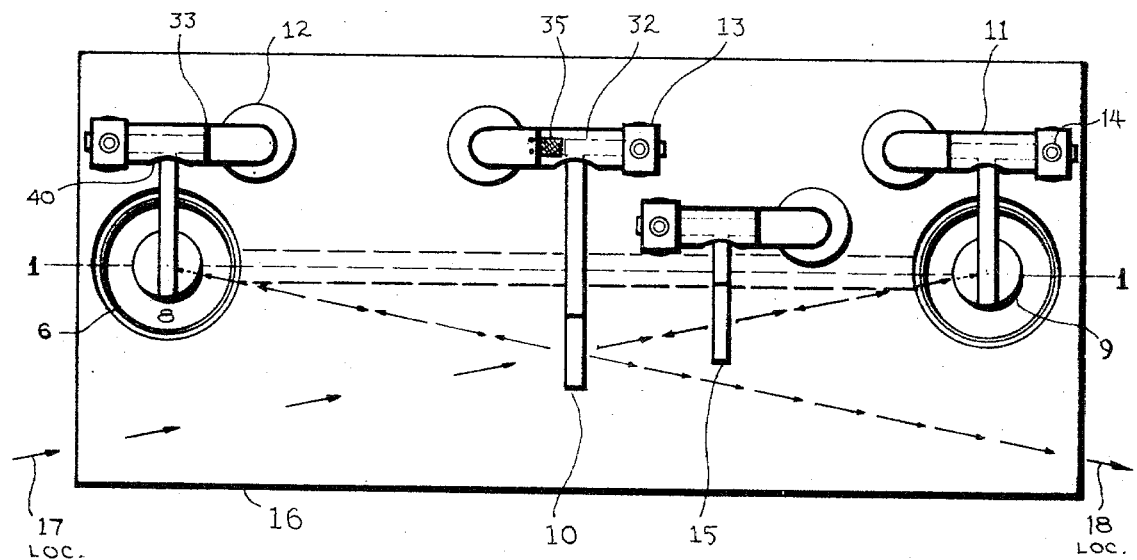
Figure 2:
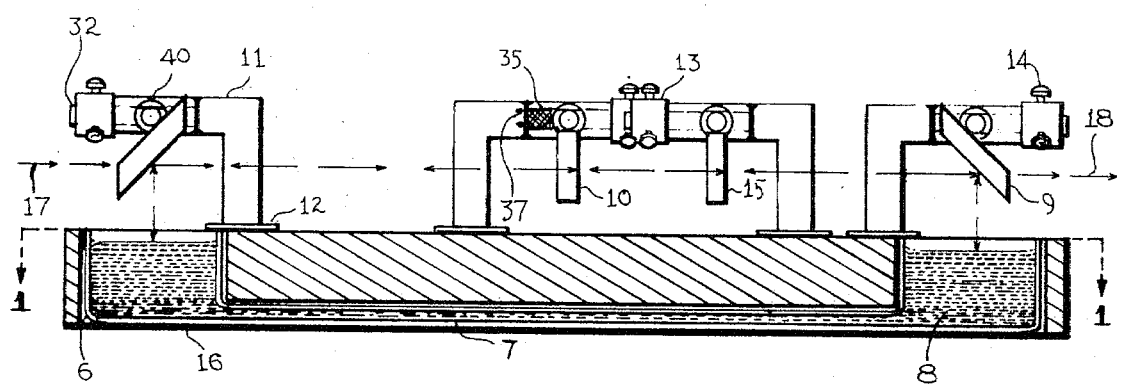
Figure 3A:
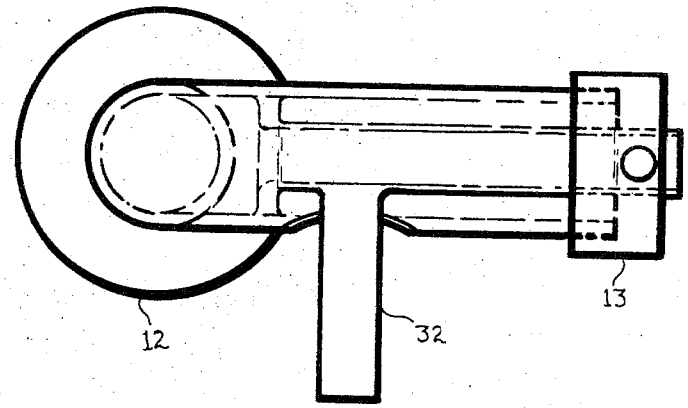
Figures 3B, 3C:
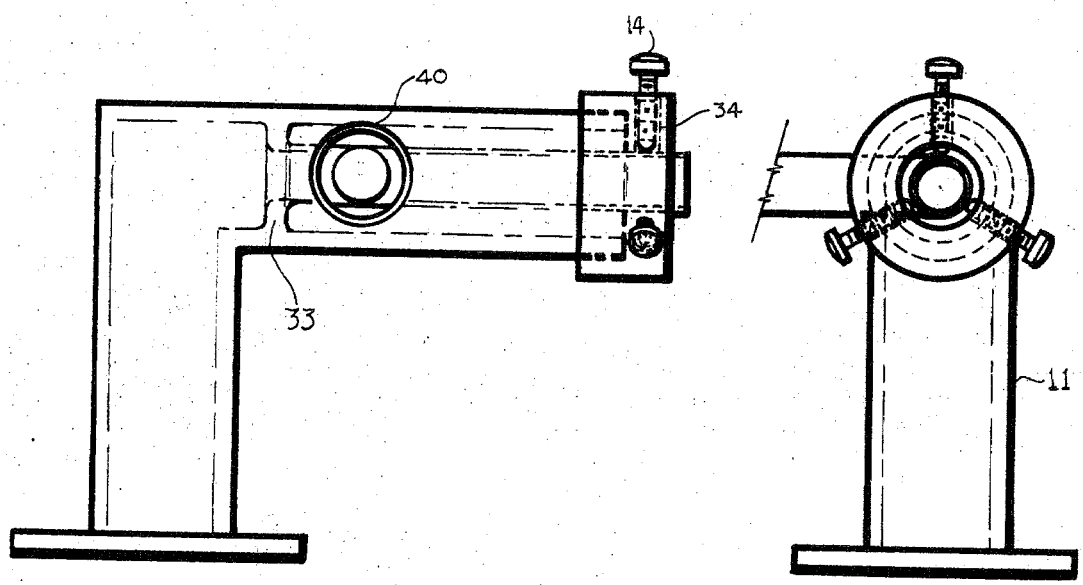
Figure 4:
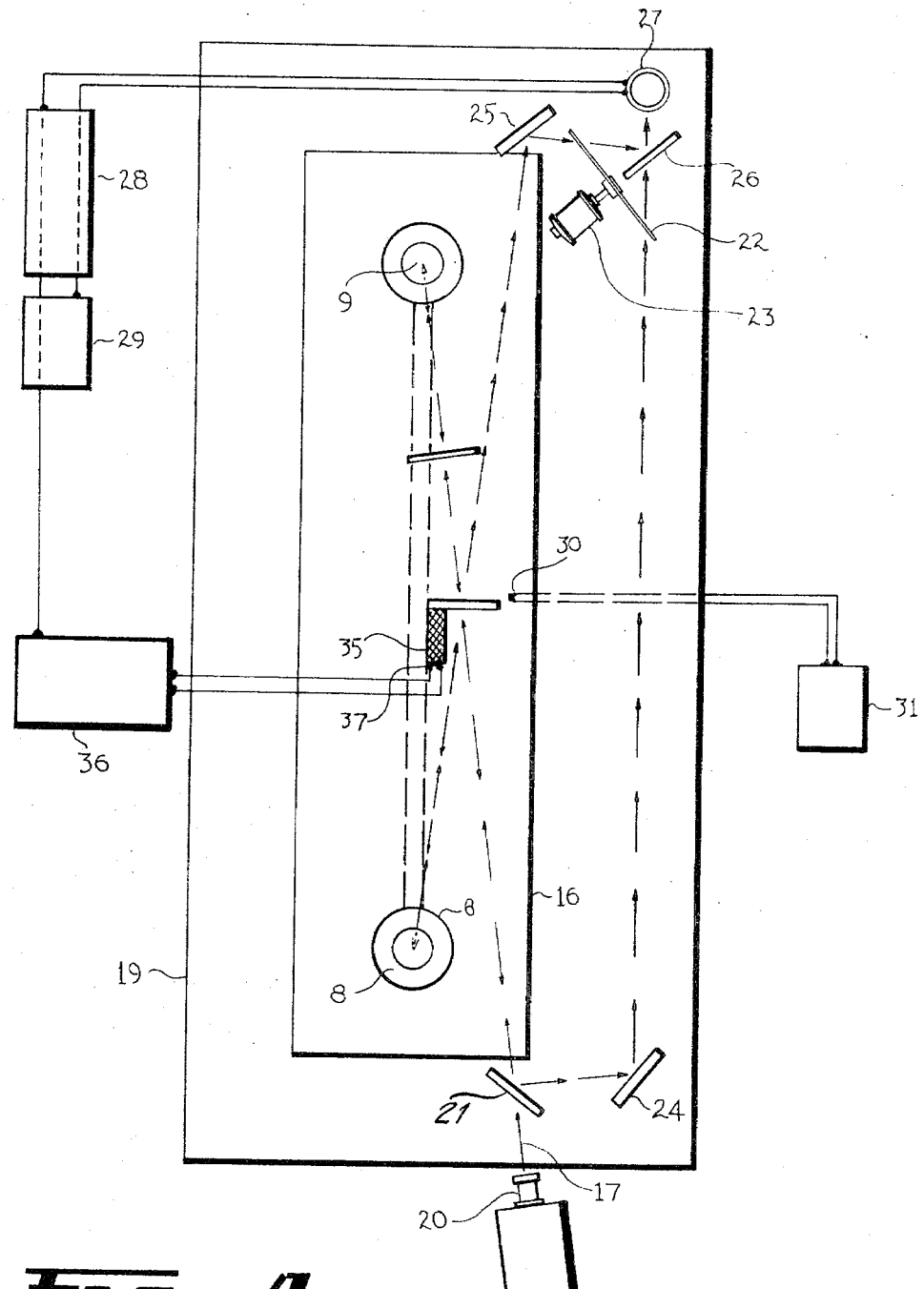

These and other objects will present themselves and become apparent from my specifications, and the appended drawings as a part thereof, in which FIG. 1 is a plan view of the gravity-inteferometer system and indicates the optics of the system;

FIG. 2 is an elevation view of the gravity-interferometer system, drawn partly in section through reference line 1—1 of FIG. 1., to illustrate the configuration of the gravity-interferometer system;

FIGS. 3A, 3B, and 3C are three views of one of the support units for each of the optical solid-state components of the gravity-interferometer system;

FIG. 4 is a schematic drawing of one arrangement of the gravity-interferometer system and its accessory apparatus and instrumentation as may be used to develop the high resolution signal output fringe pattern, with the upper portion of the shrouding enclosure removed; and, FIG. 5 is a reference sketch, geometric and symbolic of character; having no scale, but purporting to present, by the use of great magnification of the true proportions that actually do exist, (e.g. an exaggerated scale), one scientific use for the gravity-interferometer of the present invention. This sketch also includes a legend of symbols and their respective definitions as used both on the sketch and in the technical text that is a part of this specification.

The gravity-interferometer system comprises a pair of silica-glass cylindrically shaped cups, or resevoirs 6. The two cups 6 are separated as to their respective positioning by a known, a certain, and measured distance, and are provided with a tubular interconnecting and intercommunicating member 7 which adjoins the pair of cups 6 at, or near, their respective lower lateral sides, respectively, as side-arms. The tublar member 7 is also made of silica-glass and therefore it becomes an integral part of the two separated cup members by simple glassblowing technique. The two resevoir cup members 6 and their interconnecting tubular member 7 are provided with a fluid fill 8. The fill-point of the fluid fill 8 is somewhat less than brimful. This necessitates a relative position for the two adjoined cup resevoir members and their interconnecting tubular member, or members 6 and 7, respectively. A well matched pair of elipticlly shaped front-surface reflectors, or mirrors, 9, having an excellent optical quality with respect to their respective flatness, (for example, flat to within one-twentieth of one wavelength of light), are positioned and held, each one respectively, centrally located above each of the two fluid pools 8, and each one, respectively, is equidistantly located above each of the two fluid pool members, 8, respectively. A primary beam-splitter member 10 is provided and is located precisely midway between the two eliptic front surface reflector members 9, and the central area of their respective fluid pools, 8, located below. Support members 11 are provided to hold and to adjust each of the several solid-state optical components of my gravity-interferometer. These supporting members, 11, have a sub-micrometric positive adjustment, inherent to their unique design and structure: all of the support members 11 are flanged at 12 to form and provide a firm base, and each support member 11 is provided with an inner tee-shaped member 32 ring-sealed at 33, to memeber 11; and having its side-arm extension portion of its tee-shaped inner member 32 protruding and extending outwardly, as passing through hole 40 that is glassblown through the side of each outer support member 11. Adjustments, for the rotation about the $x,y$, and $z$ axes, are provided in the form of end caps 13, which are drilled and tapped at three points, circumferentially, 120° apart at 34, and adjustment fine-thread machine screws, 14, are used and are threaded into the tapped holes 34 to attain the critical and very fine adjustments of the optical components fastened to side-arms 32, thusly supported. (Note: I have used $d$–80, threads on these adjustment end-cap screws. With relative ease, it has been possible to move the supported optical component with positive control to the minute distance of $10^{-7}$ and even $10^{-8}$ centimeters — hence, the prior term "sub-micrometric.") Optional, and sometimes necessary, and similarly supported when used, is a secondary beam-splitter 15, and it is provided and is identical in optical character to the primary beam-splitter member 10. This secondary beam-splitter member 15 may be considered as a compensating optical component in the optical system of the gravity-interferometer system. Flanged base member 12 of each support member 11 is made secure, in an adhesive manner, upon a graphite (slab) member 16. It is to be noted that slab graphite member 16, as provided, is tooled to a uniform thickness, and additionally is ground and lapped to a moderate degree of flatness on both its upper and lower faces; also, that it is shaped, drilled, and recessed with a groove to receive and hold the two cup resevoir members 6 and their interconnecting tubular member 7 containing the fluid media 8.

The members thus far described in the foregoing, and given their respective specification identification numbers; or, namely, members 6 through 16, also, members 32, 33, and 34, respectively, are the basic simple items that are required to set up the typical and well known Michelson type of light interferometer system. Certain painstaking optical and geometric adjustments are, of course, required. However assiduous this may be, the use of the fluid pools in their state of equilibrium, facilitates these adjustments, and it is to be pointed out that their use is a modification which is quite novel and unique. When used properly, the equilibrium fluid flats will function successfully as the means of actually observing and of measuring the relatively infinitesimal rise and fall of the land mass, or earth itself. These infinitesimal land mass crests, or drops, are tidal of character. Their magnitude, for a one-meter gravity-interferometer system such as my invention, is in the order of (approximately) a single fringe of light, (or the mercury green line = 5,461 A.V.) Obviously, to make use of the gravity-interferometer system as thus far described and specified, it is necessary to provide a light source, located at 17. The beam of this light, at 17, passing through the optical system of my gravity-interferometer system will furnish a well defined fringe pattern of high resolution upon a suitable screen member which may be used and located at 18; or, alternately, this screen location may also be considered as the location of the exit signal (fringe pattern) and be fed from that point, or directed, into a more elaborate and sophisticated set of electronics. This latter method can provide means of recording the signal fringe pattern data, over time. An insulating shroud hood member 19 is constructed and encompasses the entire apparatus. The shroud member 19 is formed so as to provide means of maintaining a very close temperature level throughout the entire gravity-interferometer system, the light source provided and located at 17, is also provided with a suitable housing with a collimating lens group 20. Optionally, this collimating lens group may include a light filter at some optimum wavelength. When used to detect and measure the land mass tidal rise and fall, at the locale of the gravity-interferometer system, the latter is directed toward east. In order that we may later be able to either make use of a known reference signal, or make use of the complementary light signal fringe pattern which exits back out of the entrance location, the following paraphernalia is required and provided: (Note; these items are to be considered as accessary equipment, both optical and mechanical, to the gravity-interferometer system itself.) A simple beam-splitter 21 is provided and is positioned across the path of the source beam from location 17; a chopper-disc 22, and its drive motor 23; a pair of front-surface plano reflector members 24 and 25 respectively; a second simple beam-splitter 26, and a photo-multiplier detector tube 27. This latter detector, 27, requires an amplifier of the high-voltage type, as located at 28, have a signal recorder 29. The temperature within the confines of the shroud member 19, which represents the ambient gravity-interferometer system's operating temperature, is monitored and recorded; first by the sensor at 30, and its recording unit 31. The latter may be located remote from the apparatus, if desired. A transducer element 35, having electrical terminals 37, is provided and it is used as an integral part of the axially extended inner tee-shaped support member 32, contained in the main support member 11, specifically, on that support member which holds the primary beam-splitter 10. Very delicately controlled voltage, as provided by power supply unit 36, having a feed-back as part of its circuit design, is fed to the transducer element 35, imparting a sub-micrometric control motion, axially; and, since the knowledge that the feed-back portion of the circuit gets is directly received from a minute change in the signal output fringe pattern, or a minute "shift," the position of the primary beam-splitter 10, having been preset, can be maintained to an extreme close degree of arrest. Hence, when this transducer element 35 is in operation, the change of voltage in the feed-back part of the circuit will be acceptable signal data, and will be recorded as such, over time.

For the materials having optimum characteristics for their respective purpose and use, I have chosen the following in the development of my gravity-interferometer system: Quartz (fused silica) for both the primary and the secondary beam-splitters. Quartz for the pair of eliptical shaped reflectors; boro-silica glass for the oil pool cups (resevoirs) and their interconnecting tube, also for the support members. Graphite plate comprises the base member. Careful and minimum amounts of epoxy (film) is used to render a reliable adhesion medium or bonding; and, boro-silica for reservoir cups and their adjoining intercommunication tube. For the fluid pools, or the reference flats of "equilibrium fluid" contained in the cups and their interconnecting tube — there is a choice of many fluids. When local conditions preclude both air-borne and ground "noise" it is very desirable to ue pure mercury. In most cases, since there is local traffic, and air travel, I have found that a petroleum base oil, a moderate to low viscosity is very successful; it dampens the "noise" at the same time assuming an extreme "flat" surface. On the other hand, even distilled water may be used.

Experimental efforts, by others, have been made to measure the land mass (earth) tidal effects as are accepted, generally, as being attributable to both solar and lunar attraction. These prior efforts were less than successful; however, they did furnish evidence of the forces in a positive manner. One purely theoretical calculation has presented an approximation, numerically, of the land mass crest value of 30 centimeters — about 1 foot.

The device of the present invention, namely the gravity-interferometer system, functions successfully. in order to explain how it works, and why it is a successful means of the measurement of the land mass tidal effects, I will first use simple layman language; this appears quite seemly at this point: The gravity-interferometer system may be considered as divided into two states. Were one to assume an imaginary plane, horizontal and level, as separating the upper portion of the instrument from its lower portion — or, for example, a plane cutting across the top face of the graphite slab member (See Ref line 1—1, of FIG. 1.) — it would be observed that the upper set of optical components are of solid-state character; and, that the lower optical components are fluid-state character. The former components, the solid-state, will follow whatever "tilt" that the land mass may assume; whereas the fluid-state optical components will constantly seek out and maintain its own equilibrium. It now becomes apparent,therefore that the device at hand is to be considered as extremely sensitive by reason of the fact that the slightest rise or fall of the land mass, over some time period, will assume an angular deviation which, in turn, will impose a sub-micrometric optical path length change to the interferometric system of my type of gravity-interferometer system. This path length change will be evidenced by a change in the signal output fringe pattern; and this change is measureable. Thusly, the theoretical calculation referred to in the above is fully confirmed, or is corrected.

I now depart from simple layman terminology and present a more technical review to summarize the principles of physics which are involved in both the design and the operation of my type of gravity-interferometer system; especially pointing out the need for the extreme sensitivity, as attained, by/for employing exacting sub-micrometric measurements of fluid equilibrium: In the gravitational field of the rotating earth,with lunar and solar tidal influences, a fluid will assume an equilibrium surface described by the equation:-

$$\text{CONSTANT} = V(R, \phi, \theta) - \tfrac{1}{2}\omega^2 R^2 \cos\phi^2$$

F-1

$$= (3/2) \ [\tfrac{1}{3} - \cos^2 \theta_m] \ (G \ M_m R^2/D_m{}^3) - (3/2) \ [\tfrac{1}{3} - \cos^2 \theta_s] \ (GM_s R^2/D_s{}^3).$$

The first term is the potential due to the earth's mass (that is, the line integral of the unit mass weight $g$ (R, $\theta$, $\phi$). The second term is the latitude dependence on the rotating earth with angular velocity $\omega$, and, the third and fourth terms, respectively, are the lunar and the solar potentials with geocentric angles $\theta_m$, $\theta_s$, masses $M_m$, $M_s$, and the mass center distance to earth center $D_m$, $D_s$, respectively.

It is easily seen that the temporal effects of the moon motion, for example, cause a deviation of a potential line with a change of geocentric angle of:

$$dR/d\theta = (3/2) \ [M_m/M_\oplus] \ [R_\oplus/D_m]^3 \ R_\oplus \sin 2\theta_m.$$

F–2

Thus, if the deviation of a fluid were measured over a surface distance of $ds = R_\oplus \ d\theta$, then, since for the moon:

$$M_m/M_\oplus \approx 1/81 \quad R_\oplus/D_m \approx 1/60$$

F–3

$$dR = 1.25 \times 10^{-7} \sin 2\theta ds.$$

If a surface distance of one meter were used, then the maximum value of $dr$ would be 1,250 A., or one-fourth the wavelength of the green line on mercury (5,461 A.) per meter of fluid extension. This may be called "longitude position" of the surface direction and it exhibits familiar tidal phenomena. By measuring this displacement with an interferometer, it is possible to exceed the performance of the best of gravity meters employing, as they do, such devices as restoring springs possessing inertial masses. The absence of major problems of drift and temperature compensation is especially attractive for an instrument of the type which I have illustrated in may several drawings, or FIG. 1, through FIG. 4, inclusive.

There are, of course, other methods of this measurement which are considered (by self) as less sensitive and less reliable than the interferometric method which I specify; for examples, first, the measurement of the capacitance with the fluid becoming one plate of the capacitor circuit; secondly, the use of an optical-lever device which, howsoever, must have an indicated capability of the measurements of distance of an order of $5 \times 10^{-12}$ centimeters, approximately equal to $10^{-7}$ fringes of visible light. In actual practice, however, I am justified in my choice of the interferometric method, as being both reliable and practical.

When the surface direction is changed so that $ds = R_\oplus d\phi$ is the surface distance, then:

$$dR/ds = \tfrac{1}{2} \ \omega^2 R_\oplus \sin 2\phi/g \ (R_\oplus, \theta, \phi).$$

F–4

The displacement for "normal" gravity is about 0.17 centimeters per meter of fluid extension, at a latitude of 45°. This may be called the "latitude position" of the surface direction and allows a direct measurement of the ratio of the local gravitation to the distance from the earth's axis. An instrument, which employs this principle, requires comparison, astronomically, between the local zenith angle and the equilibrium angle of the fluid in the latitude position. When one employs an interferometer to measure the deviation of the fluid surface from a sphere, the precision of fringe measurement becomes the criterion for the lower limit of mass detection. The interferometer is adjusted so that a detector is looking at a gray field, hence small changes in path length produce a direct and proportional change in the light intensity monitored by the detector. The signal-to-noise ratio depends on the throughput of the interferometer, the light intensity at the photomultiplier, the sensitivity of the detector unit, and the modulation efficiency.

Reference drawing FIG. 4., indicates that a photomultiplier alternately receives light through a chopper from the gray field fringe pattern; first, from the ordinary fringes exiting at the rear of the interferometer; and, then, secondly, from the complementary fringes exiting from the input of the interferometer. This signal is then time-shared by a lock-in amplifier which takes the difference between these two signals, amplifies it, and drives a transducer which is an integral part of the primary beam-splitter support (axially) to null the difference via a feed-back circuit. The driving voltage to the transducer is recorded to indicate the total fringe shift, over the time period of a full tidal-cycle.

The total environment of my gravity-interferometer system is contained in a thermal enclosure, or a shroud, which maintains the temperature to a few-hundredths of one degree Centigrade Scale. This is considered adequate since the instrument is equal arm length and it is constructed of low expansion graphite which quickly comes to uniform temperature due to its high heat conductivity. Too, the equilibrium fluid oil pools promptly adjust to a thermal change by reason of an equal expansion in both arms; this is not detectable. The moderately viscous oil acts very effectively as a dampener with respect to airborne and ground-borne vibration. The oil maintains an optical surface which is sufficiently flat for extreme sensitivity. The inherent problems of the gravity meters in prior state of the art devices, those problems (as mentioned above) of temperature drift, and the relaxation of mechanical spring or beam elements, limited their use and their accuracy.

The stated use of my gravity-interferometer system as a means of measuring the tidal deformation of the solid earth, in turn, could complement seismological studies and be related to new data as to the composition of the interior of the earth. Indeed, by carefully analyzing the response to my gravity-interferometer system to lunar-solar gravitation it is now to be quite possible to assign an upper limit to the absorbtion of gravitation, by noting that in part of the revolution of the earth these bodies must be detected through the intervening mass of the earth.

The generation of gravitational waves by stellar collapse in a nova stage, or by intergalactic matter-antimatter collisions has been predicted by a number of eminent theoretical physicists. Such waves could conceivably excite the natural mode of the spherically shaped earth and set up oscillations which would be detected as changes in leveling, such as can be registered or detected with the gravity-interferometer system.

Finally, it is well known to the art that the Michelson type of interferometer will always produce or develop a bull's-eye fringe pattern, and that the closer to perfect and equal ray path-length on both sides (legs) of the primary beam-splitter from each of the two interfering flats, respectively, the larger the size of the central and circular fringe of that same bull's-eye. Therefore, with high quality optics, little difficulty is to be experienced in attaining a relatively massive central solid light fringe. Hence, the user of the device of the present invention, the gravity-interferometer system, has a wide scope of choice in the operation of the instrument. A relatively coarse adjustment will furnish several, or but few, fringes in the signal fringe pattern (output). These can be rendered visible, if desired, upon a suitable screen material at the outlet location, and the fringe "shift" actually be observed, and actually counted over a given time interval. Alternately, excellent interferometric adjustment resulting in the massive central light fringe, can be used to measure and record the light intensity output change over a similar time interval. The latter method may be preferred. It has certainly evidenced and made it possible to attain resolution accuracies of an order of a few-hundredths of one light fringe, repeatedly, and with accuracy.

Having thus described my invention in the above specification, and not wishing to depart from the true purposes and true principles of my invention, I feel free to modify and better my novelty as improved materials may become available; and that which I claim as new and useful and desire to secure by Letters Patent is covered in the following claims:

1. A gravity interferometer system comprising a light source producing a coherent collimated beam path; a pair of uniformly shaped right cylindrical reservoir cup members, said reservoir cup members positioned in a relatively level manner and separated by a fixed and predetermined distance; an interconnecting tubular member as extending from the lower side portion of one of the aforesaid cup members and adjoining the lower side portion of the aforesaid second cup member, said tubular member presenting an intercommunicating free passage between both of the aforesaid reservoir cup members; an equilibrium fluid medium of a quantity sufficient to substantially fill the aforesaid pair of reservoir cup members and their aforesaid interconnecting tubular member, the equilibrium fluid medium creating an essentially optically flat surface within the said cup members; two eliptically shaped flat front surface reflector members positioned equidistantly and centrally above the aforesaid two reservoir cup members, and each of said reflectors supported at an angle of forty-five degrss with respect to the axes of the said reservoir cup members; a primary beamsplitter member positioned in said beam path such that a partial beam will be directed to each of said eliptically shaped reflectors, from which the said partial beams will be reflected downward to the top flat central portion of the aforesaid fluid medium in both of the said reservoir cups; a return of the aforesaid partial beams reflected upwardly from the top central portion of said fluid surfaces, then reflected from each of the aforesaid eliptically shaped reflectors, the two partial beams redirected back to the aforesaid primary beamsplitter; light interference development at said primary beamsplitter, as a recombined set of the aforesaid partial beams, said light interference of said recombined partial beams continuing onward from the said beamsplitter and exiting from the interferometer as signal output in a visible fringe pattern at the exit of said interferometer; a secondary beamsplitter, or a compensator, positioned in the partial beam path beyond the aforesaid primary beamsplitter from the said light source beam, said compensator equalizing the optical path length for the aforesaid set of partial beams in the light interference framing portion of the interferometer system; support members for each, respectively, of the aforesaid solid-state optical components, or, the two aforesaid eliptically shaped front surface reflector members, the aforesaid primary beamsplitter member, and the aforesaid secondary compensator beamsplitter member; a flanged base portion to each of said support members; an inner tee-shaped tubular member located coaxially and ringsealed within each of the aforesaid support members, said inner tee-shaped tubular member having its side-arm thereof protruding through side holes provided through the side of each of the said support members; end cap members fastened over the end of each of the aforesaid support members, said end caps drilled and tapped to provide through-holes spaced equidistantly in a circumferential manner about the outer surface of each of the said end cap members; fine threaded adjusting machine screws inserted into the said drilled and tapped through-holes to engage with the aforesaid inner tubular tee-shaped members of the said support members, said screws providing a fine adjustment of the positioning of the said inner tubular member; a transducer to provide sub-micrometric motion to the primary beamsplitter; an exit location in the output path of the aforesaid recombined partial beams, said exit location for either the visible observation of the said fringe pattern shift, over time, or for the positioning of a photo-sensitive detector device to electronically observe and record the same said light interference fringe pattern shift, over time; a deliberate adjustment and optical alignment of the aforesaid interferometer system to obtain one given and well defined and recorded fringe pattern — observing and recording the time of day; a shrouding member to enclosed the entire gravity interferometer system; maintenance of a relatively close ambient temperature within the confines of the aforesaid shrouding member; a monitoring of the aforesaid light interference fringe pattern shift over an extended time interval, and inclusive of the recording of said fringe pattern shift in terms of single fringes, or fractions thereof; and, correlating the results of these data to calculate the angle of the earth's land mass tilt angle, said tilt angle's sine, in effect, being directly proportional to the earth's land mass tidal rise, or fall.

2. A gravity interferometer system comprised essentially the same as set forth in claim 1 but having provisions for an alternate method of signal output measurement, said method necessitating auxiliary components of optical, mechanical, and electronic character, or, — a simple beamsplitter member positioned across the path of the aforesaid coherent collimated light source beam; a pair of flat front surface reflector members; a chopper-disc and its synchronous electric motor drive assembly; a second simple beamsplitter member; a photomultiplier detector tube; an amplifier of high voltage type for the aforesaid photomultiplier detector tube member; a thermocouple junction sensor and its calibrated meter; a recorder to monitor the temperature, as connected to the said thermocouple member; a transducer member, or the aforesaid device mounted on the said main beamsplitter; a power supply having a feed-back as part of its circuitry to controll the aforesaid transducer device; a recorder to record the said feed-back voltages, over time; a deliberate adjustment of all of the aforesaid auxiliary optical components, said adjustments and said alignments resulting in the pick up of the complementary light interference fringe pattern which issues back toward the aforesaid light source beam, and redirect this secondary, or complementary light interference fringe pattern through the aforesaid chopper disc and then on to the said detector tube member; the complementary fringe pattern added to the aforesaid primary output light interference fringe pattern creating a gray field of light signal, said gray field of light will not vary with the fringe pattern shift, over time, the aforesaid transducer device holding the gray field of light; and, the evalutation of the feed-back voltages, over time, presenting signal data from which the calculation of the earth's land mass tilt angle can be obtained.

* * * * *